United States Patent [19]

Morizumi et al.

[11] 4,423,750

[45] Jan. 3, 1984

[54] LIQUEFIED GAS OVERCHARGE PREVENTION DEVICE

[75] Inventors: Mitsuo Morizumi; Masahiro Kawahata, both of Yokohama, Japan

[73] Assignee: Nissan Motor Co., Ltd., Yokohama, Japan

[21] Appl. No.: 318,074

[22] Filed: Nov. 3, 1981

Related U.S. Application Data

[63] Continuation of Ser. No. 152,236, May 22, 1980, abandoned.

[30] Foreign Application Priority Data

May 31, 1979 [JP] Japan .................. 54-72417[U]

[51] Int. Cl.³ ........................................ F16K 31/34
[52] U.S. Cl. ................................. 137/413; 137/588; 137/414; 137/210
[58] Field of Search .............. 137/413, 414, 588, 590, 137/210

[56] References Cited

U.S. PATENT DOCUMENTS 2,749,936  6/1956  Mosher ........................... 137/413
3,043,334  7/1962  Henriques ....................... 137/588
3,058,719  10/1962  Beebee ......................... 137/588 X Primary Examiner—Alan Cohan
Attorney, Agent, or Firm—Thompson, Birch, Gauthier & Samuels

[57] ABSTRACT

A liquefied gas overcharge prevention device provided with a safety valve. The overcharge prevention system comprises, in combination, a conventional pressurized gas tank charging valve having a liquid level responsive gas inlet valve mechanism, a first relief valve for regulating pressure within the tank and a second relief valve for regulating back pressure within the charging valve.

5 Claims, 4 Drawing Figures

LIQUEFIED GAS OVERCHARGE PREVENTION DEVICE

This is a continuation of application Ser. No. 152,236 filed May 22, 1980 now abandoned.

BACKGROUND OF THE INVENTION

1. Field of the Invention

The present invention relates generally to a liquefied gas overcharge prevention device, and more particularly to liquefied gas overcharge prevention device provided with a safety valve, by which a liquefied gas, for instance, such as LP gas can be supplied from the inlet port to an enclosed tank such as a fuel tank for an automotive vehicle and be regulated when the tank is charged beyond a predetermined level, and in addition, an excessive pressure within the tank can be relieved through the safety valve after the gas has been charged into the tank.

2. Description of the Prior Art

As is well known, an overcharge prevention device is necessary, whenever a liquefied gas such as LP gas is charged into a tank such as a fuel tank for an automotive vehicle, in order to prevent the gas from being overcharged thereinto. In this case, however, it is also necessary to provide a safety valve together with the overcharge prevention device in order to prevent a serious accident such as explosion of the tank due to an excessive pressure rise within the tank after the gas has been charged into the tank. Therefore, conventionally, a safety valve connected to a relief pipe projecting beyond a level of the charged liquefied gas within the tank has separately been welded in the wall of the tank. That is to say, an overcharge prevention device and a safety valve have been welded at two separate positions in the wall of a tank.

As a result of this, various problems have been encountered as follows:

(1) Since the number of necessary parts increases, the manufacture and assembly of the parts are time consuming and costly.

(2) Since weld distortion and thereby stress concentration occurs at two separate positions in the wall of the tank, the tank may be weakened. Therefore, there has been a need for a liquefied gas overcharge prevention device provided with a safety device valve, which is to be installed in a high pressure tank, without increasing welding points or the cost of the device.

BRIEF SUMMARY OF THE INVENTION

With these problems in mind, therefore, it is the primary object of the present invention to provide a liquefied gas overcharge prevention device provided with a safety valve, which can prevent the tank from being overcharged and overpressured, without increasing the welding points.

It is another object of the present invention to provide a liquefied gas overcharge prevention device which is simple in structure and therefore economical in manufacture and assembly.

It is a further object of the present invention to provide a liquefied gas overcharge prevention device which can reduce weld distortion and stress concentration in the tank wall in order to improve the strength of the tank.

It is still a further object of the present invention to provide a liquefied gas overcharge prevention device which can be used with a high-pressure tank.

In order to achieve the above-mentioned objects, the liquefied gas overcharge prevention device of the present invention comprises two relief valves, as a safety valve, connected to the supply passage which can relieve an excessive pressure from within the tank, through the supply passage, to outside the device, in addition to a conventional overcharge prevention device including a float, a poppet valve, a float valve, etc., so that overcharge and overpressure within a liquefied gas tank can be prevented. The device of the present invention is installed by welding only a single connecting pipe in the wall of the tank.

The above and other related objects and features of the present invention will be apparent from the following description of the disclosure illustrated by the accompanying drawings and the novelty thereof pointed out in the appended claims.

BRIEF DESCRIPTION OF THE DRAWINGS

The features and advantages of a liquefied gas overcharge prevention device according to the present invention over a prior-art liquefied gas overcharge prevention device will be more clearly appreciated from the following description taken in conjunction with the accompanying drawings in which like reference numerals designate corresponding numbers and structures and in which.

DETAILED DESCRIPTION OF THE PREFERRED EMBODIMENT

To facilitate understanding the present invention, a brief reference will be made to conventional liquefied gas overcharge prevention devices, depicted in FIGS. 1 and 2.

Figure 1:
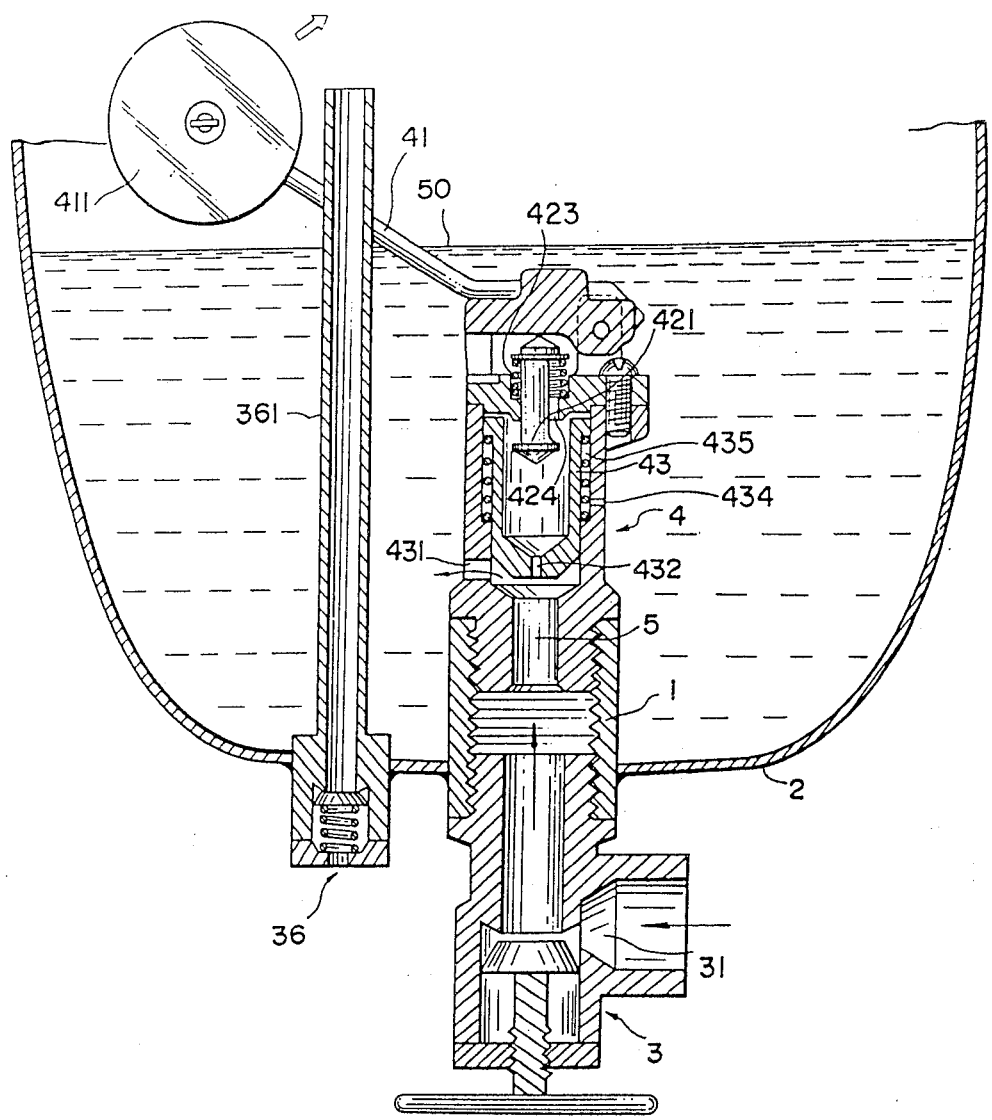
FIG. 1 is a vertical sectional view showing a prior-art liquefied gas overcharge prevention device and a safety value, which are both welded separately.

With reference to FIG. 1, a typical overcharge prevention device is composed of a connecting pipe 1 fixedly welded in through the wall 2 of a high-pressure tank, an inlet section 3 fixedly threaded into the connecting pipe 1, an overcharge prevention valve section 4 also threaded into the connecting pipe 1, and a float section 41. Within a supply passage 5 there are provided a float valve 43 and a poppet valve 421. In response to the position of a float 411, the poppet valve 421 is moved up and down to close or open a poppet port 424. If gas is supplied from an inlet port 31, the pressure of the gas pushes the float valve 43 up readily and thereby the outlet port 431 is opened to supply the gas into the tank.

The movement of the floating valve 43 is explained hereinbelow in more detail.

During charging of the pressure tank, the float 411 retains the poppet valve 421 in open position as shown in FIG. 1. Pressurized gas introduced through the connecting pipe 1 flows upwardly, the pressure thereof resulting in a force acting on the exposed lower surface of the float valve 43. With the poppet valve 421 open, the gas freely flows therethrough. However, the float valve 43 contains a restrictive orifice 432 that restricts the gas flow therethrough, resulting in a lower pressure acting on the upper surface of the float valve 43 than on the lower surface. Even though the upper surface area of the float valve 43 is greater than lower surface area, as shown in FIG. 1, a sufficient gas pressure differential across the orifice 432 will result in a greater force acting on the float valve lower surface, resulting in the float valve 43 being urged upwardly. With the poppet valve 421 open as shown, this sufficient pressure differential is maintained and the float valve 43 is retained, by pressure, in its upper position to permit charging of the pressure tank through the outlet port 431.

When the liquid level 50 reaches a predetermined level, the float 411 rises, permitting the poppet valve spring 423 to urge the poppet valve 421 upwardly, closing the poppet port 424. When this occurs, the aforementioned pressure differential across the float valve orifice 432 immediately drops to zero, and the equal pressure acting on the larger upper surface of the float valve 43 forces the valve 43 down to close the outlet port 431. In addition, a pressure relief hole 434 is provided in the valve section 4 in order to relieve the pressure in the annular space 435, so that the valve 43 can smoothly move down to close the outlet port 431.

As described above, the overcharge prevention device is useful only for preventing an overcharge. However, the tank is susceptible to a rise in pressure due to a rise in temperature. In case pressure within the tank rises abnormally high, there may be a danger of a serious accident such as explosion of the tank after the gas has been charged thereinto. Therefore, conventionally a safety valve 36 connected to a relief pipe 361 has been separatedly installed in the tank. In this case, the relief pipe 361 must be long enough to project beyond the maximum level of the charged liquefied gas, in order to relieve only excessive gas pressure within the tank. That is to say, two devices of an overcharge prevention device and a safety valve have been welded at two separate positions in the wall of the tank. As explained in the Description of the Prior Art, it is not desirable to increase the number of welding points from the standpoint of strength of the tank.

Figure 2:
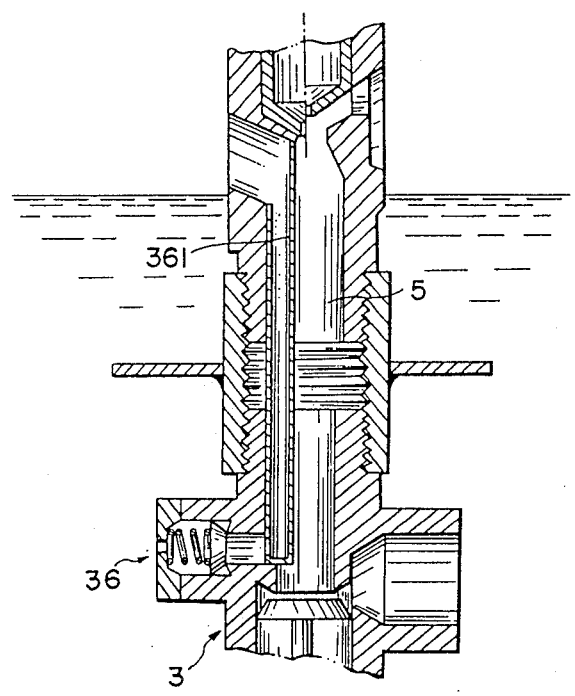
FIG. 2 is a vertical sectional view showing another prior-art liquefied gas overcharge prevention device in which a safety valve and a relief pipe are attached to the supply passage thereof.

In order to overcome this problem, another device is shown in FIG. 2, in which a safety valve 36 is connected to the inlet section 3 and a relief pipe 361 is formed within the supply passage 5. In this case, however, since two passages are formed separately within a supply passage, it is very difficult and complicated to manufacture and assemble the parts without increasing the cost.

In view of the above description of conventional liquefied gas overcharge prevention devices, a detailed description of the present invention will be made hereinbelow by referring to FIGS. 3 and 4, initially to FIG. 3, wherein a preferred embodiment of the present invention is illustrated particularly.

Figure 3:
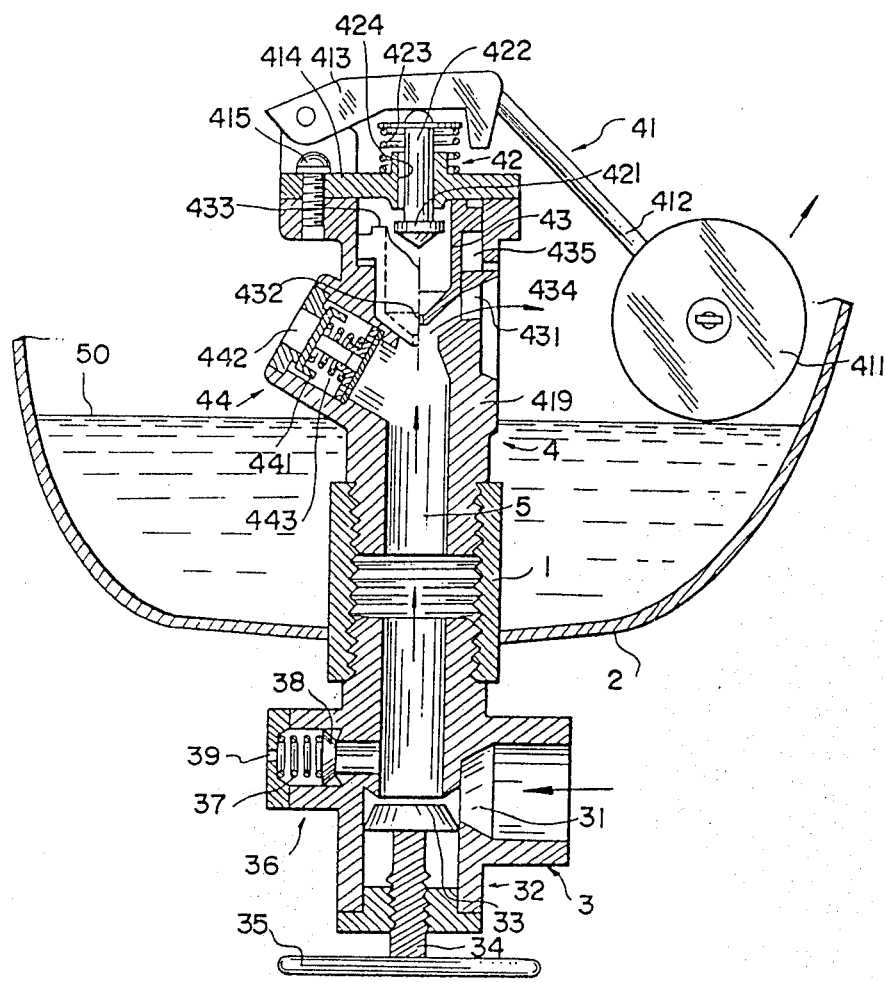
FIG. 3 is a vertical sectional view showing a liquefied gas overcharge prevention device provided with two relief valves embodying the present invention.

With reference to FIG. 3, the liquefied gas overcharge prevention device mainly comprises a connecting pipe 1 fixedly welded through the wall 2 of a tank, an inlet section 3 fixedly threaded into the connecting pipe 1, and an overcharge prevention valve section 4 also fixedly threaded into the connecting pipe 1.

The inlet section 3, connected to the bottom side of the connecting pipe 1, includes an inlet port 31, an open/close valve portion 32, and a safety valve portion 36. An inlet pipe (now shown) is connected to the inlet port 31 to supply a liquefied gas from a gas source. An open/close valve element 33 is located at the bottom side of the inlet section 3 and is fixed to an end of a threaded valve shaft 34. A handle 35 is fixed to the other end of the shaft 34. The valve element 33 can be moved up and down when the handle 35 is rotated clockwise or counterclockwise to open or close the supply passage 5. On the opposite side of the inlet port 31, the safety valve portion 36 is provided to communicate with the outside in case the pressure within the supply passage 5 rises abnormally high, for example, up to 20-24 kg/cm. This abnormal pressure can be preset by adjusting a safety valve spring 37 which always biases a safety valve element 38 in the direction to close a safety valve port 39.

The overcharge prevention valve section 4 comprises a valve case 419, a poppet valve portion 42, a floating valve 43, and another safety valve portion 44. This safety valve 44 is called a first relief valve hereinafter, while the safety valve 36 is called a second relief valve to avoid confusion.

A float 411 is fixed to a float lever 413 through a float rod 412. The float lever 413 is pivotably supported on a overcharge prevention valve case lid 414. A poppet valve element 421 attached to the poppet valve shaft 422 is urged, upwardly in FIG. 3, by a poppet valve spring 423 to close a poppet port 424 when the float 411 stays up, that is, when the liquid within the tank reaches a predetermined level. A float valve 43 is provided within the valve case 419 so as to freely travel up and down when there is no pressure applied thereto. When the valve 43 comes up it opens an outlet port 431, and when the valve 43 goes down it closes the outlet port 431.

The operation of the float 411, poppet valve 421 and float valve 43 is identical to that of the device of FIG. 1, described hereinabove.

The first relief valve portion 44 is positioned below the float valve 43 and above a predetermined maximum level of the liquefied gas, so as to communicate with the gasified space of the liquefied gas supplied within the tank. If the gas pressure within the tank rises abnormally high, the first relief valve element 441 is pushed down against the action of a valve spring 443 to discharge the pressure through a relief valve port 442 into within the supply passage 5. In the event the resulting pressure in supply passage 5 is also greater than a predetermined maximum, a second relief valve 36 relieves this gas pressure through an orifice 39 into the atmosphere or a suitable collection means (not shown). The operation of the second relief valve is similar to the first—a sufficient predetermined pressure acting on the valve element 38 will overcome the force of the spring 37, permitting the excess pressure to escape around the valve element and out the orificie 39.

Operation of the embodiment, the structure of which is explained above, is described in detail hereinbelow.

If the handle 35 is rotated counterclockwise to open the open/close valve 33, after the gas supply pipe (not shown) has been connected to the inlet port 31 to supply a liquefied gas into a tank from a liquefied gas supply source, the liquefied gas is fed into the supply passage 5. In this case, since a valve-opening pressure of the second relief valve 36 has been preset to be higher than a pressure of the charged liquefied gas, the second relief valve 36 remains closed during charging of the tank. The first relief valve 44, of course, also remains closed, so that the supplied liquefied gas is not introduced into the tank therethrough.

When the gas is charged into the tank, the liquefied gas level must be lower than a predetermined level. Therefore, the float 411 stays down and depresses the poppet valve 42 downward to open the poppet port 424, as shown in FIG. 3.

As explained hereinabove in detail referring to FIG. 1, the pressurized gas within the supply passage 5 acts against the exposed lower surface of the float valve 43. Since the poppet valve 421 is open, the gas freely flows therethrough and a pressure differential is produced across the orifice 432, resulting in a larger force acting on the float valve lower surface. Accordingly, the float valve 43 is urged upwardly, as shown in the right side of FIG. 3 to open the inlet port 431.

When the liquefied gas level 50 reaches a predetermined level, the float rises, and the poppet valve 421 closes the poppet port 424. In this case, the abovementioned pressure differential across the float valve orifice 432 immediately drops to zero. Therefore, the equal pressure acting on the larger upper surface of the float valve 43 forces the valve 43 down to close the outlet port 431.

If the pressure within the tank increases for any reason, a potentially dangerous situation develops. In order to prevent such situation, the first relief valve 44 and the second relief valve 36 are provided with the device of the present invention.

When a difference in pressure between the supply passage 5 and the liquefied gas within the tank increases to a predetermined value, the first relief valve 44 opens to introduce the abnormal pressure into the supply passage 5. Also, if the pressure within the supply passage 5 increases beyond a preset pressure, the second relief valve 36 opens to relieve the pressure therethrough. Thereafter, the pressure within the supply passage 5 drops and a difference in pressure across the first relief valve 44 increases to open the valve port 442. Thus an excessive pressure within the tank is continuously relieved through the first relief valve 44, through the supply passage 5 and the second relief valve 36.

In this case, if it is not desirable to relieve the gas to the atmosphere directly, a relief tank may be provided.

Figure 4:
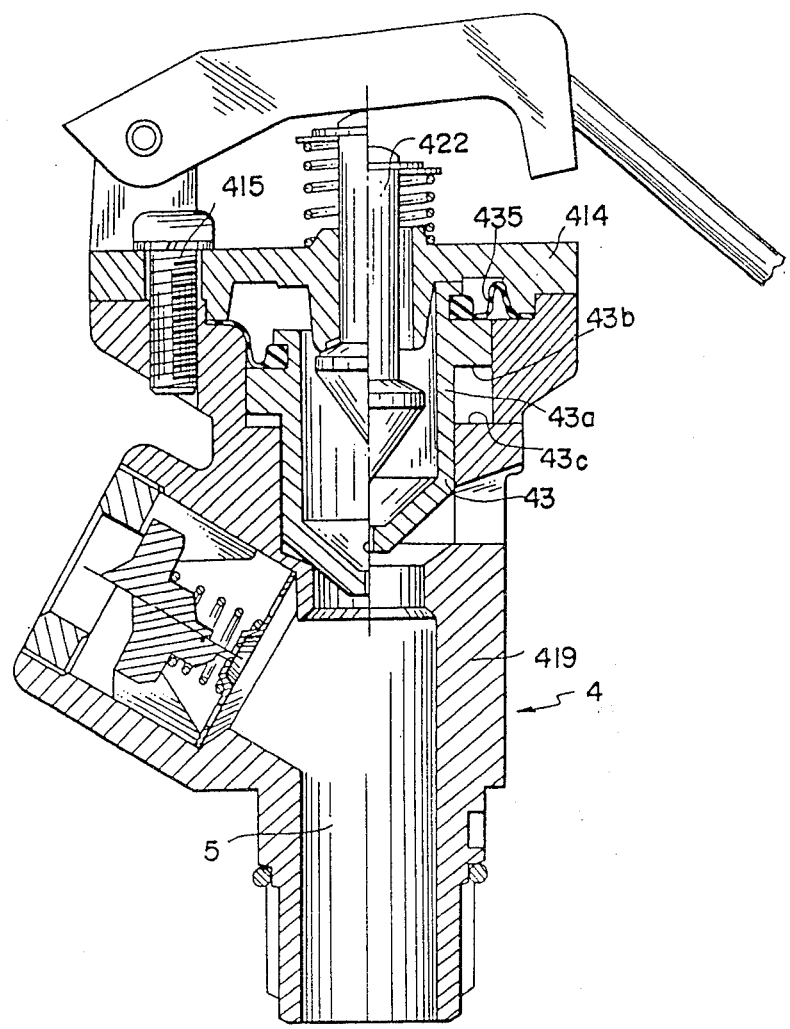
FIG. 4 is an enlarged vertical sectional view showing a modified embodiment of a liquefied gas overcharge prevention device of the present invention.

FIG. 4 illustrates a modified embodiment of the present invention, in which a diaphragm 436 is clamped around its outer edge between the valve case 419 and lid 414, and is fixedly attached around its inner edge to the upper flat portion of the float valve 43. The diaphragm 436 thus disposed can positively prevent the liquefied high-pressure gas within the supply passage 5 from seeping between the outer slidable surface of the float valve 43 and the inner slidable surface of the valve case 419 to between the poppet valve shaft 422 and the inner slidable surface of the lid 414. In addition, the form of the diaphragm 436 is such that it urges the float valve 43 upwardly, reducing the loat valve opening pressure. It is also possible to dispose a rubber seal around the outer surface 43a of the float valve 43, on the lower portion 43b of the float valve 43, or on the flat portion 43c of the valve case 419 to seal against pressure leakage.

In this embodiment, since a clearance is provided between the outer peripheral surface of 43a of the float valve 43 and the inner peripheral surface 43d of the valve case 419, a pressure within the annular space defined by the outer peripheral surface 43a of the float valve and the inner peripheral surface 43d of the valve case 419 can be relieved beneath the diaphragm 436, without need of a pressure relief hole 434 as shown in FIG. 3.

As may be readily appreciated by those skilled in the art, the liquefied gas overcharge prevention device of the present invention results in, inter alia, the following improvements:

Since first and second relief valves are both connected to the supply passage without providing an additional relief passage, (1) the structure is simple and therefore the manufacture and assembly of fewer parts will reduce the cost.

(2) the welded points in the enclosed tank wall are reduced to one position and therefore weld distortion and stress concentration will be reduced, thus strengthening the tank.

(3) a high pressure gas can be charged into the tank because of its increased strength.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An automatic liquefied gas overcharge prevention device for installation within an enclosed tank, comprising:
   (a) a valve case having:
      (1) a supply passage to supply a liquefied gas;
      (2) an inlet port connected to said supply passage, to which a supply pipe is attached to supply the gas from a gas source;
      (3) an outlet port connected to said supply passage, from which the gas is supplied into the enclosed tank; and
      (4) a poppet port communicating between said supply passage and a gasified space within the enclosed tank;
   (b) a float being movable up and down in response to changes in the level of the supplied liquefied gas;
   (c) a poppet valve element for opening or closing said poppet port in response to the position of said float;
   (d) a float valve element having an orifice therein for opening and closing said outlet port in response to a pressure differential across said orifice created by pressurized gas flowing therethrough and through said poppet port and in accordance with an area difference between the upper and lower surfaces thereof;
   (e) a first relief valve for relieving an excessive pressure from within the enclosed tank to within said supply passage; and
   (f) a second relief valve for relieving an excessive pressure from within said supply passage to outside the device;
   whereby a liquefied gas can be supplied from the inlet port, through the supply passage and the outlet port, to within the enclosed tank, and regulated when the pressure in the tank increases beyond a predetermined level, an excessive pressure within the tank or within the supply passage being relieved through the first and second relief valves, thus regulating the gas pressure within the tank.

2. An automatic liquefied gas overcharge prevention device for installation within an enclosed tank as set forth in claim 1, further comprising a pressure relief hole provided on the upper portion of said valve case for relieving a pressure within an annular space defined by the outer peripheral surface of said float valve element and the inner peripheral surface of said valve case.

3. An automatic liquefied gas overcharge prevention device for installation within an enclosed tank as set forth in claim 1, further comprising a diaphragm for preventing the gas in said supply passage from seeping between the outer peripheral surface of said floating valve element and the inner peripheral surface of said valve case.

4. An automatic liquefied gas overcharge prevention device for installation within an enclosed tank as set forth in claim 1, further comprising an open/close valve element provided outside the enclosed tank for opening and closing said inlet port.

5. An automatic liquefied gas overcharge prevention device for installation within an enclosed tank as set forth in claim 1, wherein said valve case comprises:
 (a) a connecting pipe welded at an appropriate position to the enclosed tank;
 (b) an overcharge prevention valve section threaded into said connecting pipe from inside the tank, said float, poppet valve, floating valve element, first relief valve, outlet port, and poppet port all being associated with said overcharge prevention valve section; and
 (c) an inlet section threaded into said connecting pipe from outside the tank, said second relief valve and said inlet port being associated with said inlet section.

* * * * *